US008195991B2

(12) United States Patent
Kitazoe

(10) Patent No.: US 8,195,991 B2
(45) Date of Patent: Jun. 5, 2012

(54) HANDLING OF INTEGRITY CHECK FAILURE IN A WIRELESS COMMUNICATION SYSTEM

(75) Inventor: Masato Kitazoe, Hachiouji (JP)

(73) Assignee: Qualcomm Incorporated, San Diego, CA (US)

( * ) Notice: Subject to any disclaimer, the term of this patent is extended or adjusted under 35 U.S.C. 154(b) by 182 days.

(21) Appl. No.: 12/484,989

(22) Filed: Jun. 15, 2009

(65) Prior Publication Data

US 2009/0320100 A1 Dec. 24, 2009

Related U.S. Application Data

(60) Provisional application No. 61/074,555, filed on Jun. 20, 2008, provisional application No. 61/078,110, filed on Jul. 3, 2008.

(51) Int. Cl.
G06F 11/00 (2006.01)
G01R 31/28 (2006.01)
H04B 1/00 (2006.01)
H04B 17/00 (2006.01)

(52) U.S. Cl. ........ 714/708; 714/704; 714/712; 370/241; 370/242; 370/245; 370/248; 455/70; 455/115.1; 455/115.2

(58) Field of Classification Search .................. 714/708, 714/704, 712; 370/241, 242, 245, 248; 455/70, 455/115.1, 115.2

See application file for complete search history.

(56) References Cited

U.S. PATENT DOCUMENTS 7,826,858 B2 * 11/2010 Tsai et al. ..................... 455/458
7,890,753 B2 * 2/2011 Dahan et al. .................. 713/164
2003/0091048 A1 5/2003 Jiang 2008/0101609 A1 5/2008 Jiang
2009/0077417 A1 * 3/2009 Hildebrand ..................... 714/15
2009/0124212 A1 * 5/2009 Islam et al. ..................... 455/70
2009/0154408 A1 * 6/2009 Jeong et al. ................... 370/329

FOREIGN PATENT DOCUMENTS

EP 1928130 A2 6/2008

OTHER PUBLICATIONS

3GPP TS 36.323 V8.2.1, 3rd Generation Partnership Project; Technical Specification Group Radio Access Network; Evolved Universal Terrestrial Radio Access (E-UTRA); Packet Data Convergence Protocol (PDCP) specification (Release 8), May 2008.
ETSI: "Universal Mobile Telecommunications System (UMTS); Radio Resource Control (RRC); Protocol specification (3GPP TS 25.331 version 8.2.0 Release 8); ETSI TS 125 331" ETSI, May 2008, pp. 44-48, XP002557610.

(Continued)

*Primary Examiner* — John H Tabone, Jr.
(74) *Attorney, Agent, or Firm* — Michael J. Dehaemer

(57) ABSTRACT

Handling of integrity check failure in a wireless communication system can safely send the mobile station to the idle mode upon detection of security failure. Alternatively or in addition, attempts to recover from the security failure situation can be enabled without forcing the mobile station to enter idle mode. The mobile station autonomously transitions to idle mode when the integrity check failure is detected a certain threshold number 'X' times during a specified period 'Y'. Whereupon, the mobile station initiates the Radio Resource Control (RRC) connection re-establishment procedure after integrity check failure is detected. In the RRC connection re-establishment procedure, the security parameters are re-initialized to provide a possibility to recover from the failure situation.

16 Claims, 12 Drawing Sheets

OTHER PUBLICATIONS

Ghadialy Zahid: "UMTS Security: A Primer", [Online] Jun. 11, 2004, pp. 1-7, XP002557609 Retrieved from the Internet: URL: http://www.3g4g.co.uk/Tutorial/ZG/zg-securi ty.html> [retrieved on Nov. 25, 2009] sections "Introduction" and "Security Mode set-up procedure".

International Search Report and Written Opinion—PCT/US2009/048060, International Search Authority—European Patent Office—Mar. 18, 2010.

Kitazoe Masato., "Qualcomm contributions on LTE C-plane" 3GPP e-mail server Jun. 24, 2008, XP002571688 Retrieved from the Internet: URL: http://list.etsi.org/scripts/wa.exe?A2=ind0806&L=3gpp_tsg_ran_wg2&T=0&0=D&P=25196> [retrieved on Mar. 4, 2010].

Qualcomm Europe (Rapporteur) : "Report : [62bis-LTE-B04] Email discussion on potential security issues with respect to re-establishment, and the handling of IP failure" 3GPP Draft; R2-084060, 3rd Generation Partnership Project (3GPP), Mobile Competence Centre ; 650, Route Des Lucioles ; F-06921 Sophia-Antipolis Cedex ; France, no. Jeju; 20080812, Aug. 12, 2008, XP050319215.

Qualcomm Europe: "Handling of integrity protection check failure" 3GPP Draft; R2-083572, 3rd Generation Partnership Project (3GPP), Mobile Competence Centre ; 650, Route Des Lucioles ; F-06921 Sophia-Antipolis Cedex ; France, vol. RAN WG2, no. Warsaw, Poland; 20080624, Jun. 24, 2008, XP050140942.

* cited by examiner

HANDLING OF INTEGRITY CHECK FAILURE IN A WIRELESS COMMUNICATION SYSTEM

CLAIM OF PRIORITY UNDER 35 U.S.C. §119

The present application claims priority to provisional U.S. Application Ser. No. 61/074,555, entitled "METHOD AND APPARATUS FOR PROCESSING INTEGRITY PROTECTION CHECK FAILURES," filed Jun. 20, 2008, and claims priority to provisional U.S. Application Ser. No. 61/078,110, entitled "A METHOD AND APPARATUS FOR HANDLING INTEGRITY CHECK FAILURE IN A WIRELESS COMMUNICATION SYSTEM", filed Jul. 3, 2008, both assigned to the assignee hereof and both incorporated herein by reference in their entirety.

BACKGROUND

1. Field

The present disclosure relates generally to communication, and more specifically to techniques for transmitting information in a wireless communication network.

2. Background

Wireless communication networks are widely deployed to provide various services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

The third generation (3 G) mobile communications system has adopted a Wideband Code Division Multiple Access (WCDMA) wireless air interface access method for a cellular network. WCDMA can provide high frequency spectrum utilization, universal coverage, and high quality, high speed multimedia data transmission. The WCDMA method also meets all kinds of Quality of Service (QoS) requirements simultaneously, providing diverse flexible two-way transmission services and better communication quality to reduce transmission interruption rates.

In order to protect user data and signaling information from being intercepted by unauthorized devices, the prior art 3 G mobile communications system can trigger Integrity Protection and Ciphering. Integrity protection is utilized for protecting Radio Resource Control (RRC) messages transmitted on Signaling Radio Bearers (SRBs), while Ciphering is utilized for protecting Radio Link Control Protocol Data Units (RLC PDU) transmitted on Dedicated Channels.

Radio Bearers (RBs) are "logical" data communication exchange channels, and are utilized for providing data transmission exchange to the user or for providing RRC layer control signal transmission exchange. SRBs are the RBs specifically used for transmitting RRC messages, and utilized for completing various RRC control processes, such as RRC Connection Management Procedures, RB Control Procedures, RRC Connection Mobility Procedures, and Measurement Procedures. Therefore, the messages sent on SRB are sporadic.

Moreover, take an RRC communications protocol specification established by the 3 GPP for example, after the integrity protection procedure is activated, every time the User Equipment (UE) or the network transmits signaling message, the UE or the network will add a Message Authentication Code for data Integrity (MAC-I), whose content is different for each signaling message. A legal UE or network can authenticate the accuracy of the MAC-I, and thereby accept the received signaling message when the expected MAC-I and the received MAC-I are the same or act as if the message was not received when the calculated expected MAC-I and the received MAC-I differ, i.e. when the integrity protection check fails.

Even between legal UE and network, occasionally or perhaps as a rare event, the received MAC-I does not match the calculated (expected) MAC-I. For example, false detection of a successful cyclic redundancy check (CRC) in the physical layer occurs. As another example, de-synchronization of input parameter(s) to the algorithm (e.g. COUNT, IK) between network and UE can occur.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In accordance with one or more aspects and corresponding disclosure thereof, various aspects are described in connection with recognizing that in UMTS Terrestrial Radio Access (UTRA) RRC, it is specified that the UE shall ignore the message for which integrity protection check has been failed. This seems to suggest that the UTRA specification relies on the network implementation to take an appropriate action when a security problem is detected. The most likely network behavior in this case is to release the RRC connection. In case of security failure, it is appropriate to use Radio Resource Control (RRC) CONNECTION RELEASE on Common Control Channel (CCCH) message without integrity protection so that the message will not be discarded by the UE due to integrity protection check failure. However, this tool is not available in E-UTRA (Evolved UMTS Terrestrial Radio Access) (i.e., RRC Connection Release is always integrity protected and sent on Dedicated Control Channel (DCCH)). It is advantageous to provide an innovation wherein the network can recover from security failure for the robustness of the protocol, even thought the occurrence of such an event is very rare. Moreover, the network may not detect the problem on the uplink with the UE delaying the recovery.

In one aspect, a method is provided for handling protocol errors in a wireless communications system by employing a processor executing computer executable instructions stored on a computer readable storage medium to implement the following acts: A first signaling radio bearer is established and an integrity protection procedure is triggered for the first signaling radio bearer. A first message is received on the first signaling radio bearer. An integrity protection failure message is transmitted in response to an integrity protection check failure for the first message Transitioning to an idle mode occurs in response to frequent integrity protection check failure for received messages on the first signaling radio bearer.

In another aspect, a method is provided for handling protocol errors in a wireless communications system by employing a processor executing computer executable instructions stored on a computer readable storage medium to implement the following acts: A first signaling radio bearer is established and an integrity protection procedure of the first signaling radio bearer is triggered. A first message is received on the first signaling radio bearer. A connection re-establishment request is transmitted in response to an integrity protection check failure for the first message. Recovering from security failure occurs in response to receiving a connection re-establishment message. Transitioning to an idle mode occurs in response to receiving a connection re-establishment reject message not subject to the integrity protection procedure.

In an additional aspect, an apparatus is provided for handling protocol errors in a wireless communications system comprising at least one computer readable storage medium storing computer executable instructions that, when executed by at least one processor, implement components. In particular, means are provided for establishing a first signaling radio bearer and triggering an integrity protection procedure of the first signaling radio bearer. Means are provided for receiving a first message on the first signaling radio bearer. Means are provided for transmitting an integrity protection failure message in response to an integrity protection check failure for the first message. Means are provided for transitioning to an idle mode in response to frequent integrity protection check failure for received messages on the first signaling radio bearer.

In another additional aspect, an apparatus is provided for handling protocol errors in a wireless communications system comprising at least one computer readable storage medium storing computer executable instructions that, when executed by at least one processor, implement components. In particular, means are provided for establishing a first signaling radio bearer and triggering an integrity protection procedure of the first signaling radio bearer. Means are provided for receiving a first message on the first signaling radio bearer. Means are provided for transmitting a connection re-establishment request in response to an integrity protection check failure for the first message. Means are provided for recovering from security failure in response to receiving a connection re-establishment message. Means are provided for transitioning to an idle mode in response to receiving a connection re-establishment reject message not subject to the integrity protection procedure.

In a further aspect, an apparatus is provided for handling protocol errors in a wireless communications system comprising a processor operatively coupled to a computer readable medium having stored thereon the following computer executable components. In particular, a computing platform is provided for establishing a first signaling radio bearer and triggering an integrity protection procedure of the first signaling radio bearer. A receiver is for receiving a first message on the first signaling radio bearer. A transmitter is for transmitting an integrity protection failure message in response to an integrity protection check failure for the first message. The computing platform is further for transitioning to an idle mode in response to frequent integrity protection check failure for received messages on the first signaling radio bearer.

In another further aspect, an apparatus is provided for handling protocol errors in a wireless communications system comprising a processor operatively coupled to a computer readable medium having stored thereon the following computer executable components. In particular, a computing platform is for establishing a first signaling radio bearer and triggering an integrity protection procedure of the first signaling radio bearer. A receiver is for receiving a first message on the first signaling radio bearer. A transmitter is for transmitting a connection re-establishment request in response to an integrity protection check failure for the first message. The computing platform is further for recovering from security failure in response to receiving a connection re-establishment message; and for transitioning to an idle mode in response to receiving a connection re-establishment reject message not subject to the integrity protection procedure.

In yet one aspect, a method is provided for handling protocol errors in a wireless communications system by employing a processor executing computer executable instructions stored on a computer readable storage medium to implement the following acts. A first signaling radio bearer is established as a forward channel. A first message is transmitted on the first signaling radio bearer including integrity protection authentication. An integrity protection failure message is received in response to an integrity protection check failure for the first message. Resources are released for user equipment determined to be transitioning to an idle mode in response to frequent integrity protection check failure for received messages on the first signaling radio bearer.

In yet another aspect, a method is provided for handling protocol errors in a wireless communications system by employing a processor executing computer executable instructions stored on a computer readable storage medium to implement the following acts. In particular, a first signaling radio bearer is established and an integrity protection procedure of the first signaling radio bearer is triggered. A first message is transmitted on the first signaling radio bearer including integrity protection authentication. A connection re-establishment request is received. A connection re-establishment message is transmitted for enabling user equipment to recover from security failure in response to determining a valid connection re-establishment request. A connection re-establishment reject message not subject to the integrity protection procedure is transmitted to prompt user equipment to transition to an idle mode in response to determining an invalid connection re-establishment request.

In yet an additional aspect, an apparatus is provided for handling protocol errors in a wireless communications system comprising at least one computer readable storage medium storing computer executable instructions that, when executed by at least one processor, implement components. In particular, means are provided for establishing a first signaling radio bearer as a forward channel. Means are provided for transmitting a first message on the first signaling radio bearer including integrity protection authentication. Means are provided for receiving an integrity protection failure message in response to an integrity protection check failure for the first message. Means are provided for releasing resources for user equipment determined to be transitioning to an idle mode in response to frequent integrity protection check failure for received messages on the first signaling radio bearer.

In yet another additional aspect, an apparatus is provided for handling protocol errors in a wireless communications system comprising at least one computer readable storage medium storing computer executable instructions that, when executed by at least one processor, implement components. In particular, means are provided for establishing a first signaling radio bearer and triggering an integrity protection procedure of the first signaling radio bearer. Means are provided for transmitting a first message on the first signaling radio bearer including integrity protection authentication. Means are provided for receiving a connection re-establishment request. Means are provided for transmitting a connection re-establishment message for enabling user equipment to recover from security failure in response to determining a valid connection re-establishment request. Means are provided for transmitting a connection re-establishment reject message not subject to the integrity protection procedure to prompt user equipment to transition to an idle mode in response to determining an invalid connection re-establishment request.

In yet a further aspect, an apparatus is provided for handling protocol errors in a wireless communications system comprising a processor operatively coupled to a computer readable medium having stored thereon the following computer executable components. In particular, a computing platform is for establishing a first signaling radio bearer as a forward channel. A transmitter is for transmitting a first message on the first signaling radio bearer including integrity protection authentication. A receiver is for receiving an integrity protection failure message in response to an integrity protection check failure for the first message. The computing platform is further for releasing resources for user equipment determined to be transitioning to an idle mode in response to frequent integrity protection check failure for received messages on the first signaling radio bearer.

In yet another further aspect, an apparatus is provided for handling protocol errors in a wireless communications system comprising a processor operatively coupled to a computer readable medium having stored thereon the following computer executable components. A computing platform is for establishing a first signaling radio bearer and triggering an integrity protection procedure of the first signaling radio bearer. A transmitter is for transmitting a first message on the first signaling radio bearer including integrity protection authentication. A receiver is for receiving a connection re-establishment request. The transmitter is further for transmitting a connection re-establishment message for enabling user equipment to recover from security failure in response to the computing platform determining a valid connection re-establishment request. The transmitter is further for transmitting a connection re-establishment reject message not subject to the integrity protection procedure to prompt user equipment to transition to an idle mode in response to the computing platform determining an invalid connection re-establishment request.

In another additional aspect, a computer program product is provided for handling protocol errors in a wireless communications system. At least one computer readable storage medium stores computer executable instructions that when executed by at least one processor implement components: A set of instructions causes a computer to establish a first signaling radio bearer and triggering an integrity protection procedure of the first signaling radio bearer. A set of instructions causes the computer to receive a first message on the first signaling radio bearer. A set of instructions causes the computer to transmit an integrity protection check failure message in response to an integrity protection check failure for the first message. A set of instructions causes the computer to transition to an idle mode in response to frequent integrity protection check failure for received messages on the first signaling radio bearer.

In yet another additional aspect, a computer program product is provided for handling protocol errors in a wireless communications system. At least one computer readable storage medium stores computer executable instructions that when executed by at least one processor implement components. A set of instructions causes a computer to establish a first signaling radio bearer as a forward channel. A set of instructions causes the computer to transmit a first message on the first signaling radio bearer including integrity protection authentication. A set of instructions causes the computer to receive an integrity protection failure message in response to an integrity protection check failure for the first message. A set of instructions causes the computer to release resources for user equipment determined to be transitioning to an idle mode in response to frequent integrity protection check failure for received messages on the first signaling radio bearer.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

Handling of integrity check failure in a wireless communication system can safely send the mobile station to the idle mode upon detection of security failure. Alternatively or in addition, attempts to recover from the security failure situation can be enabled without forcing the mobile station to enter idle mode. The mobile station autonomously transitions to idle mode when the integrity check failure is detected at a certain threshold number 'X' times during a specified period 'Y'. Whereupon, the mobile station initiates the Radio Resource Control (RRC) connection re-establishment procedure after integrity check failure is detected. In the RRC connection re-establishment procedure, the security parameters are re-initialized to provide a possibility to recover from the failure situation.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

Figure 1:
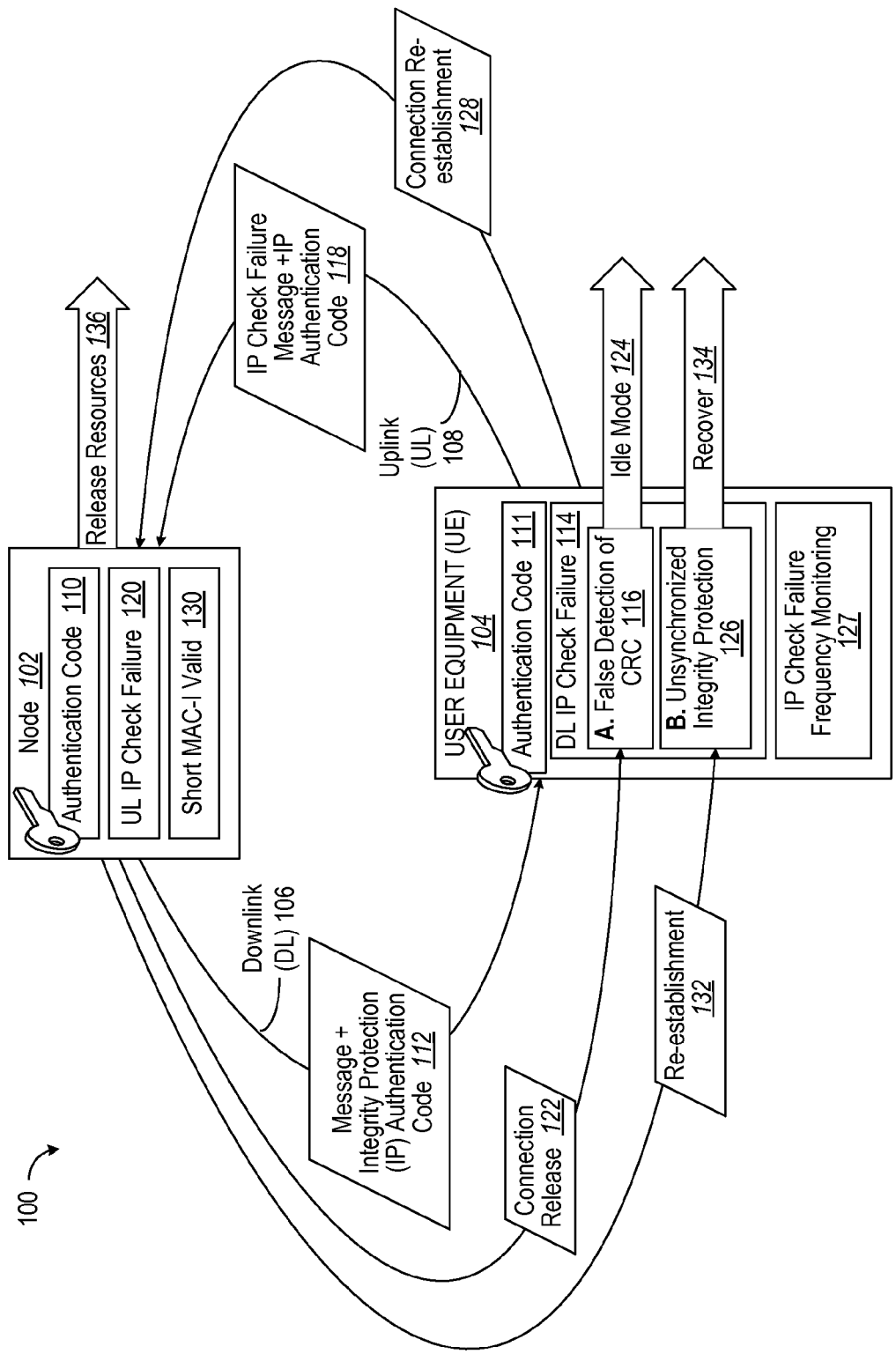
FIG. 1 depicts a block diagram of a wireless communication system providing handling for integrity protection check failure on a downlink from a base node to user equipment (UE).

With reference to FIG. 1, a communication system 100 is depicted as a wireless network wherein a node (e.g., macro base station, femto cell, pico cell, etc.) 102 schedules user equipment (UE) 104 to receive a downlink (DL) 106 and to transmit on an uplink (UL) 108. To prevent unauthorized use, the node 102 has an original authentication code 110 that is provided to the UE 104 as depicted at 111 to ensure integrity protection for the system 100. In an illustrative implementation, the node 102 generates a repeating sequence of authentication codes for each message 112 based upon a Message Authentication Code for data Integrity (MAC-I).

It should be appreciated that the node 102 handles an integrity protection check failure on the uplink 108; however, instances can occur that result in an integrity protection check failure 114 on the downlink 106. False detection of a successful cyclic redundancy check (CRC) in the physical layer by the UE 104 depicted at 116, is a rare occurrence. Advantageously, the UE 104 transmits an integrity protection check failure message 118 that is coded with the integrity protection authentication code (e.g., MAC-I). At this point, the node 102 can have a component that detects an UL integrity protection check failure as depicted at 120. Alternatively, the node 102 can detect this integrity protection check failure on the uplink 108 in another type of transmission. The node 102 can respond with a connection release message 122 that is not sent on signaling radio bearer that is subject to integrity protection checking. Thus, even with an error in the integrity protection checking at the UE 104, the UE 104 receives and acts upon this connection release message 122, unlike a message with a MAC-I whose content would be ignored if the integrity protection checking failed. Thus, the UE 104 transitions to idle mode as depicted at 124. Advantageously, the UE 104 utilizes an integrity protection check failure frequency tracking component 127 that determines that the number in a row or as a function of time of integrity protection check failures warrants transitioning to idle mode 124. Thus, a rare instance of a false detection of a successful CRC can be overcome.

Alternatively or in addition, the UE 104 can detect or become subject to an unsynchronized integrity protection component 126. Thus, while the original authentication code 111 is valid, the sequence of calculated MAC-I for each message yields an integrity protection check failure. The UE 104 transmits a connection re-establishment request including a MAC-I as depicted at 128, seeking to recover from the lack of synchronization. The node 102 utilizing the MAC-I validity checking component 130 to determine that the original authentication code 111 being used by the UE 104 is valid or not. If so, a re-establishment message 132 transmitted on the downlink 106 allows the UE 104 to recover its integrity protection synchronization, as depicted at 134. If the MAC-I is invalid, then the node 102 can continue to send connection release messages 122 as necessary to force the UE 104 to transition to the idle mode 124.

With the benefit of the foregoing, the node 102 is able to anticipate when the UE 104 is going to transition to idle mode 124 due to integrity protection check failures on the downlink 106, and thus release resources as depicted at 136. Alternatively or in addition, the node 102 is capable of prompting the UE 104 to transition to the idle mode 124 when integrity protection check failure is detected on the uplink 108.

Figure 2:
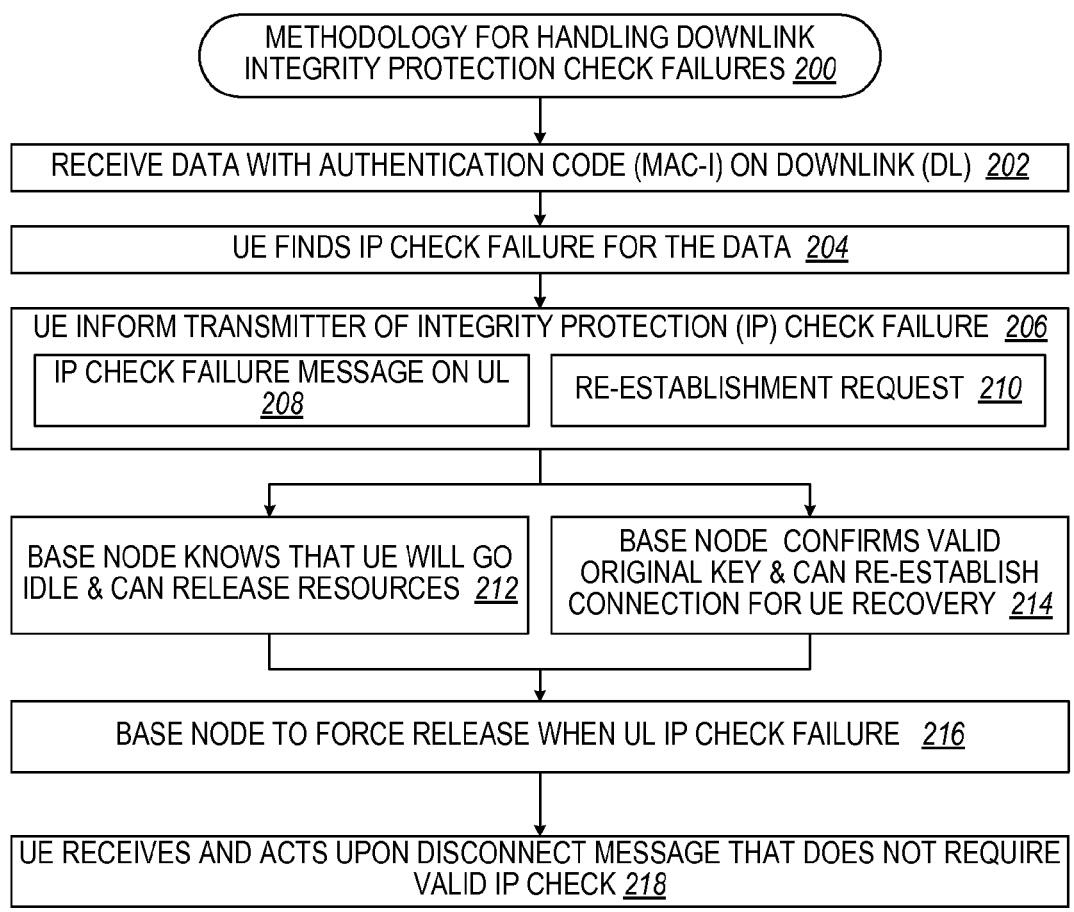
FIG. 2 depicts a methodology or sequence of operations for handling downlink integrity protection check failures on a downlink.

In FIG. 2, a methodology or sequence of operations 200 is provided for handling of protocol errors on a downlink. The base node transmits and UE receives on the downlink data with an authentication code (e.g., MAC-I) (block 202). The UE finds integrity protection check failure for the data (block 204). The UE transmits on the uplink information to the base node indicative of the integrity protection check failure on the downlink (block 206). For instance, the UE sends an integrity protection check failure message (block 208). Alternatively, the UE sends a connection re-establishment request (block 210). In one situation, the base node knows based upon receipt of this information that the UE will go idle, such as after a certain number of such reports indicative of frequent integrity protection check failures on the downlink. Thus, the base node can release resources (block 212). Alternatively, the base node can determine that the UE has a valid original authentication code (MAC-I) and could recover, thus approves or initiates re-establishment (block 214). In some instances, the base node is first to detect an integrity protection check failure (block 216) and can take advantage of a disconnect message sent on the downlink that does not utilize a signaling radio bearer subject to integrity protection (block 218). Thus, the UE will act upon the content of this disconnect message.

Figure 3:
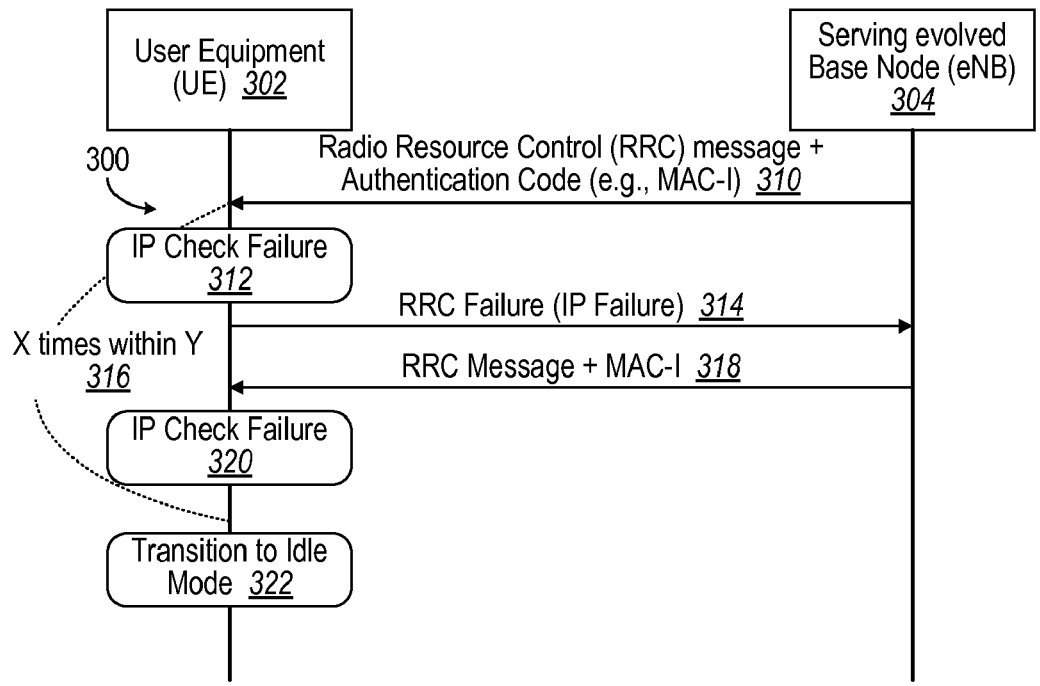
FIG. 3 depicts a timing diagram for a UE reporting integrity protection check failure to a base node and transitioning to idle mode after repeated integrity protection check failures.

In FIG. 3, a methodology or sequence of operations 300 is depicted for Radio Resource Control (RRC) connection release on Common Control Channel (CCCH) wherein UE 302 autonomously enters idle mode with respect to serving evolved Base node (eNode-B) 304. An RRC message with authentication code is sent on the downlink from the eNB 304 to the UE 302 as depicted at 310. The UE 302 determines that the integrity protection check has failed (block 312). The UE 302 responds as depicted at 314 by transmitting an RRC Failure (i.e., integrity protection failure) message. This downlink centralized method relies upon the UE 302 detecting integrity protection check failure and entering idle mode autonomously after a certain criterion is met. In this solution, the UE tries to send a RRC failure message to the network to inform the occurrence of the integrity protection check failure as depicted at 314.

In one aspect, it would be sensible here to provide a means to prevent the UE from going to idle mode only after a single detection of integrity protection check failure because the integrity protection check failure can happen with the false detection of CRC. This can be solved by having a criterion that the UE only enters idle mode after detecting frequent integrity protection check failure, depicted as "X time(s) within Y" at 316. For clarity, one additional iteration is depicted with the eNB 304 responding at 318 with the RRC message with MAC-I on the downlink, which results in another integrity protection check failure (block 320). When the criterion is satisfied, the UE 302 transitions to idle mode (block 322). Since this process is determinative with the eNB 304 kept informed, the eNB 304 is able to anticipate the UE idle status and release resources.

Alternatively the criterion can be such that the UE 302 enters idle mode after consecutive value "X" integrity protection check failure detections, which can be for a specified period "Y". It should be appreciated that this consecutive value "X" could be 1 and period "Y" could be the entire duration of the RRC connection such that the depicted "X times within Y" can encompass a wide range of desired settings.

Figure 4:
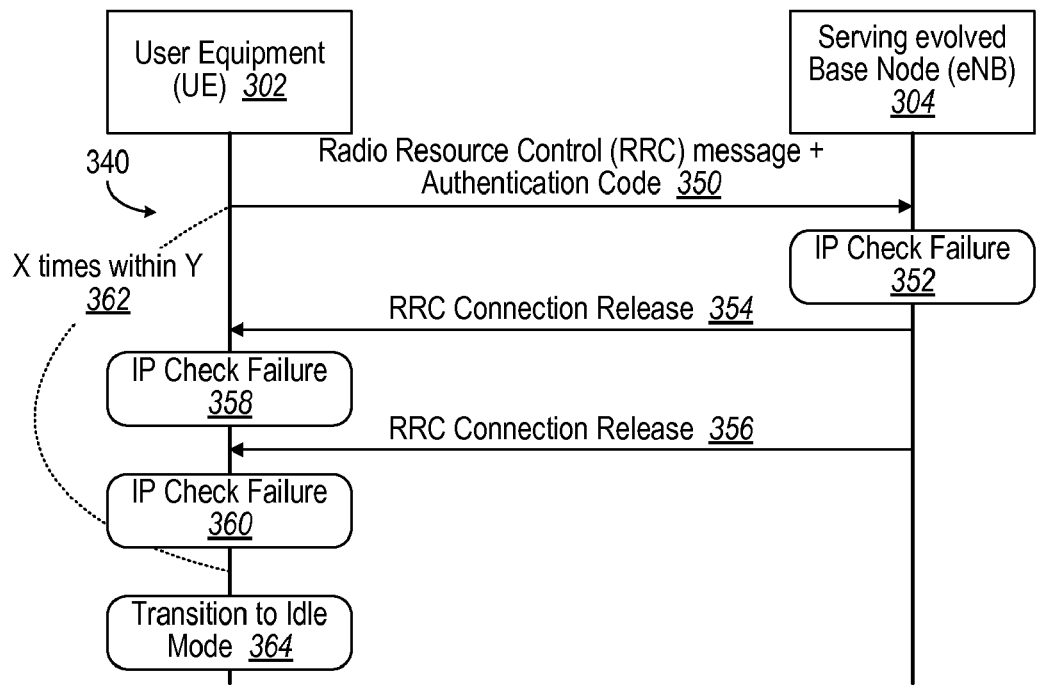
FIG. 4 depicts a timing diagram for a base node forcing a UE to transition to the idle mode after integrity protection check failure on an uplink.

In FIG. 4, it should be noted that this mechanism automatically brings about the ability for the network (e.g., eNB 304) to release the RRC connection in case of integrity protection check failure in the uplink in a methodology or sequence of operations 340. An UE 302 transmits RRC message with authentication code as depicted at 350 on the uplink. Upon failure detection in an uplink (block 352), the network can send one or more instances of RRC Connection Release message depicted at 354, 356. The UE 302 will enter idle mode regardless of whether or not the integrity protection check in the downlink fails. This is depicted as each connection release message 354, 356 forcing a corresponding integrity protection check failure (blocks 358, 360) that is sufficient to satisfy criterion "X times within Y" 362. Then the UE 302 transitions to idle mode (block 364).

Figure 5:
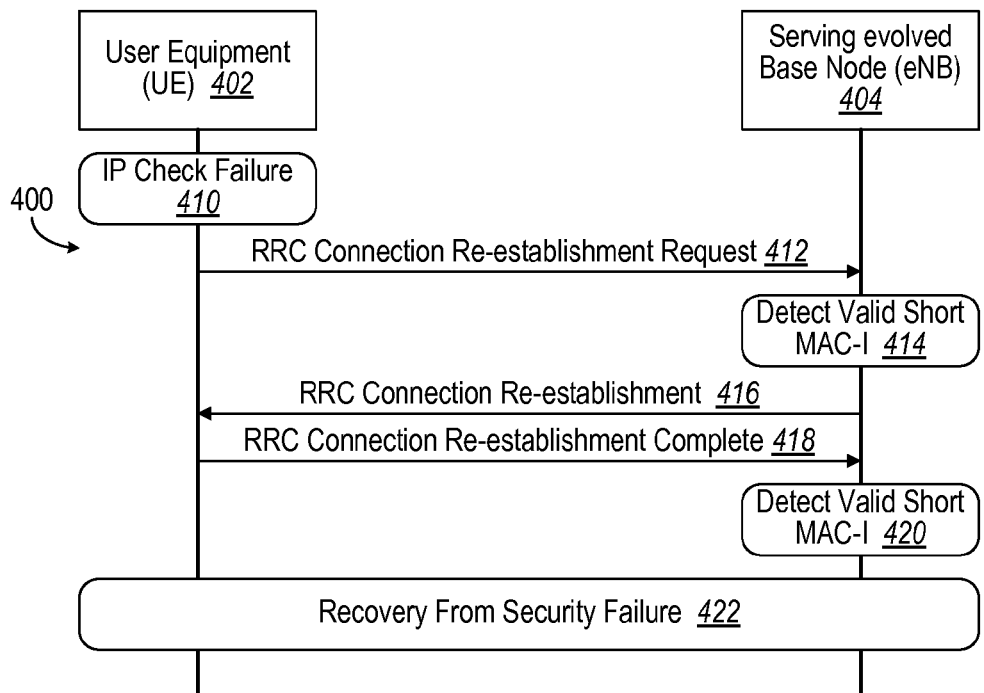
FIG. 5 depicts a timing diagram for a UE successfully recovering integrity protection check failure after requesting the base node for re-establishment.

In FIG. 5, a methodology or sequence of operations 400 provides RRC connection re-establishment for recovering in certain instances when security failure occurs for integrity protection on the downlink between UE 402 and eNB 404. This solution is to try to possibly recover from the security failure situation by relying on the COUNT value reset and KeNB (i.e. security key) change taking place at the RRC connection re-establishment procedure. Additionally this solution takes the advantage of the RRC Connection Re-establishment Reject message being transmitted on CCCH which is not integrity protected.

The UE 402 determines an integrity protection check failure on the downlink (block 410) and transmits an RRC connection re-establishment request on the uplink (block 412). The eNB 404 determines that the request is sent with a valid MAC-I (block 414) and responds by transmits RRC Connection Re-establishment message (block 416). The UE 402 responds with an RRC Connection Re-establishment Complete message sent with a MAC-I 418. The eNB 404 confirms that the MAC-I is still valid (block 420). Recovery from the security failure then occurs (block 422). For instance, the cryptosynch is reset and a security key is re-derived during the procedure. In FIG. 5, a successful recovery case is depicted wherein the serving eNB 404 finds valid MAC-I for RRC Connection Re-establishment Request message 412 and valid MAC-I for RRC Connection Re-establishment Complete message 418.

Figure 6:
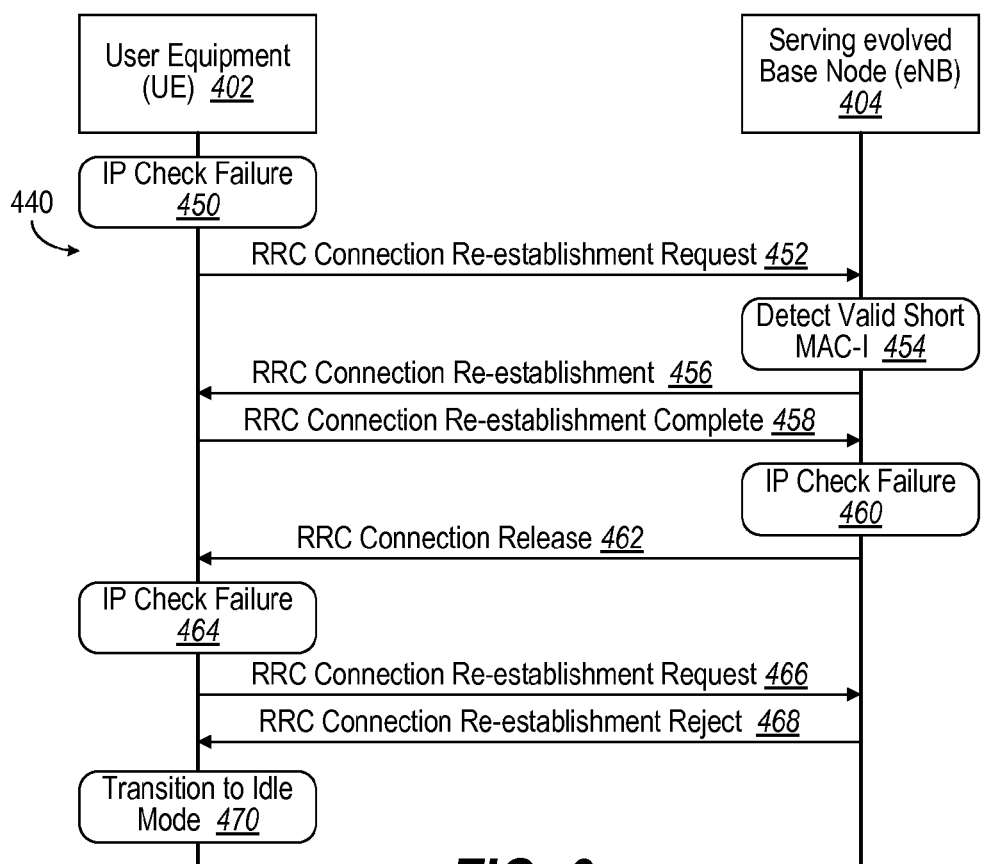
FIG. 6 depicts a timing diagram for a UE transitioning to idle mode after unsuccessfully requesting re-establishment without a valid Message Authentication Code for data Integrity (MAC-I).

In FIG. 6, a methodology or sequence of operations 440 depicts a similar or identical implementation when the recovery is unsuccessful. An UE 402 determines an integrity protection check failure on the downlink (block 450) and transmits an RRC connection re-establishment request on the uplink (block 452). The eNB 404 determines that the request is sent with a valid MAC-I (block 454) and responds by transmits RRC Connection Re-establishment message (block 456). The UE 402 responds with an RRC Connection Re-establishment Complete message 458. The eNB 404 finds that the MAC-I is invalid (block 460). The eNB 404 transmits an RRC Connection Release message as depicted at 462 deemed by the UE 402 as integrity protection check failure (block 464). When the UE 402 requests RRC Connection Re-establishment as depicted at 466, the eNB 404 can respond with a rejection 468 and thus the UE 402 transitions to idle mode (block 470).

Figure 7:
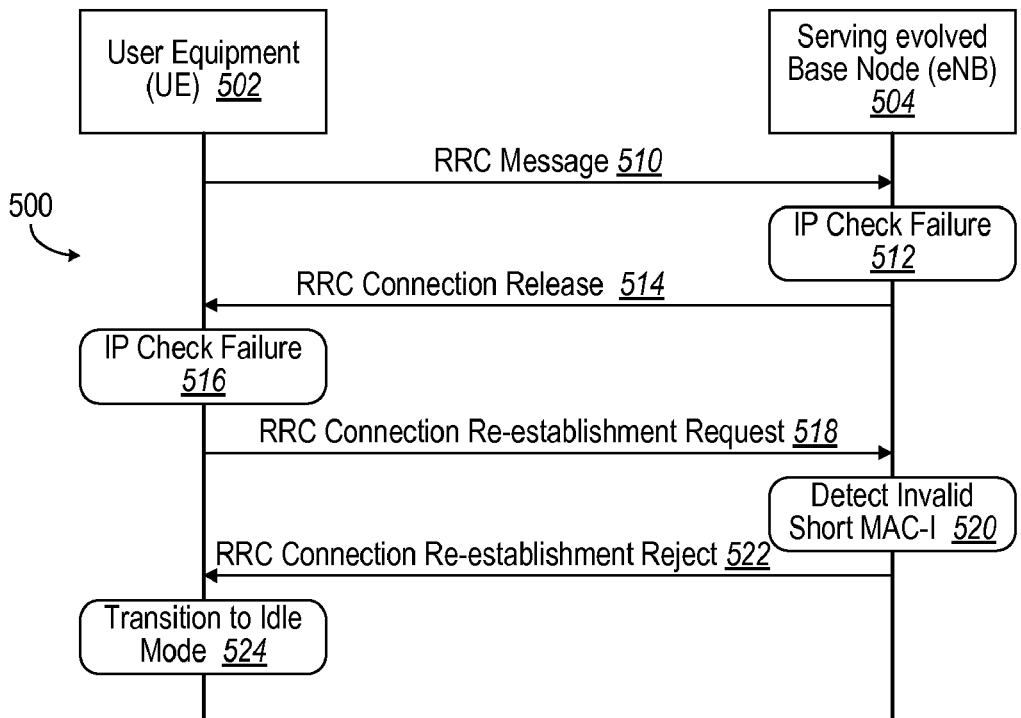
FIG. 7 depicts a timing diagram for a base node choosing to delay fixing a security problem first detected on the uplink.

Alternatively, the network could choose not to fix the security problem right after looking at the MAC-I in the RRC Connection Re-establishment Request message that could tell the integrity of the original key that the UE has been using. In one illustrative aspect in FIG. 7, a methodology or sequence of operations 500 between UE 502 and network depicted as eNB 504 begins with an RRC message on the uplink as depicted at 510 that is found by the eNB 504 to have an integrity protection check failure (block 512). An RRC Connection Release is sent on the downlink as depicted at 514. The subsequent integrity protection check failure (block 516) at the UE 502 results in an RRC Connection Re-establishment request on the uplink 518, which in this instance is detected as an invalid MAC-I (block 520). This prompts the eNB 504 to send a rejection to the re-establishment request as depicted at 522 and the UE 502 transitions to idle mode (block 524).

Figure 8:
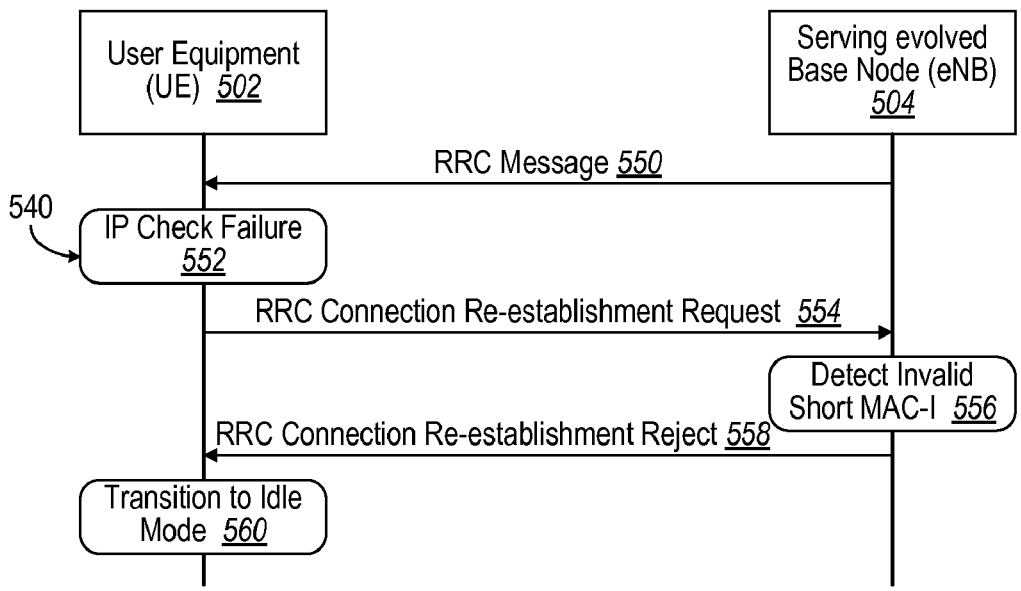
FIG. 8 depicts a timing diagram for a base node choosing to delay fixing a security problem first detected on the downlink.

In FIG. 8, a similar situation for a methodology or sequence of operations 540 begins as depicted at 550 with an eNB 504 transmitting an RRC message on the downlink. An UE 502 detects an integrity protection check failure (block 552). When an RRC Connection Re-establishment request is transmitted on the uplink as depicted at 554, the eNB detects an invalid MAC-I (block 556) and rejects re-establishment as depicted at 558. The UE 502 then transitions to idle mode (block 560).

Figure 9:
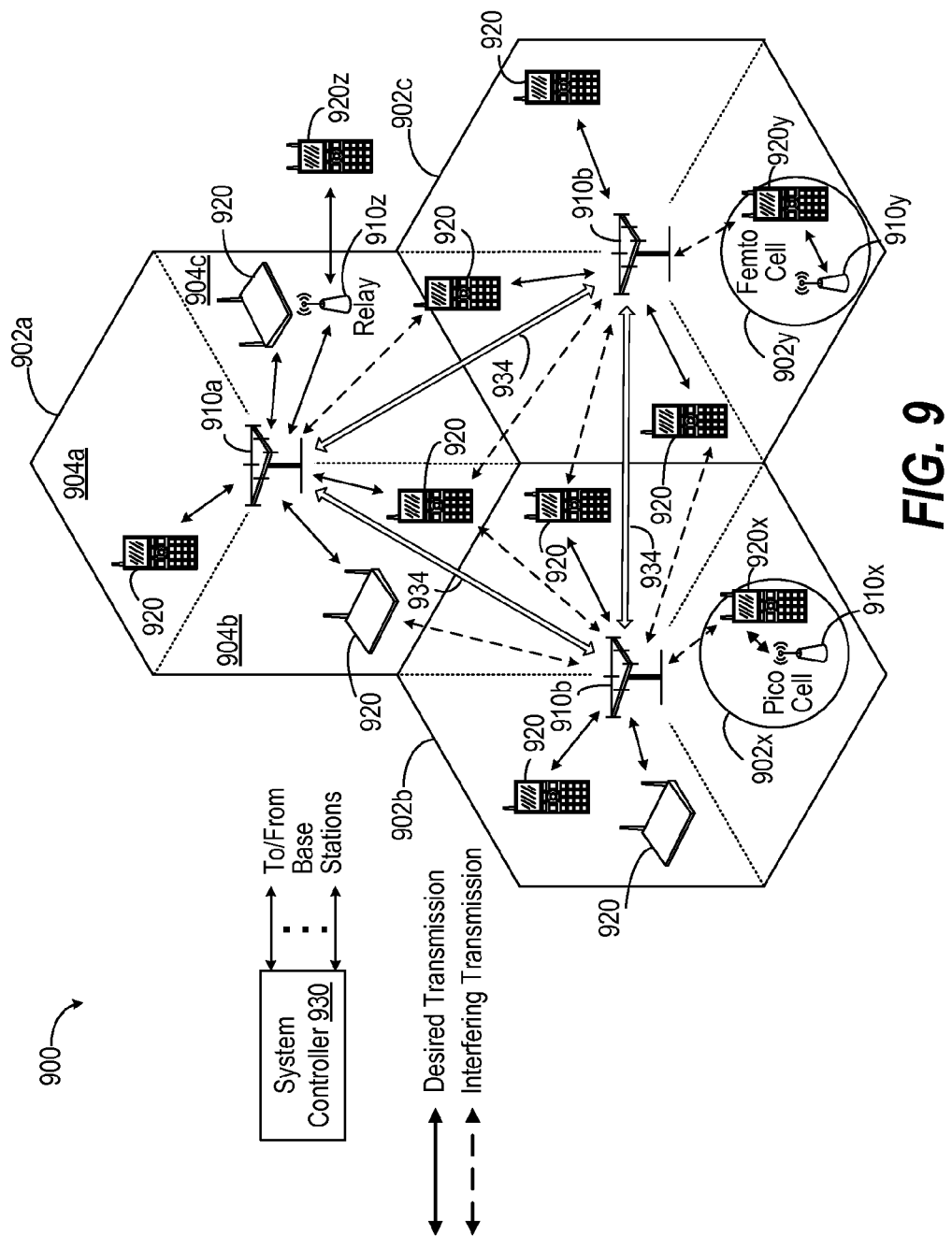
FIG. 9 depicts a heterogeneous wireless communication network for handling protocol errors.

FIG. 9 shows a wireless communication network 900, which may include a number of base stations 910 and other network entities. A base station may be a station that communicates with the terminals and may also be referred to as an access point, a Node B, an evolved Node B, etc. Each base station 910 may provide communication coverage for a particular geographic area. The term "cell" can refer to a coverage area of a base station and/or a base station subsystem serving this coverage area, depending on the context in which the term is used.

A base station may provide communication coverage for a macro cell, a pico cell, a femto cell, and/or other types of cell. A macro cell may cover a relatively large geographic area (e.g., several kilometers in radius) and may allow unrestricted access by terminals with service subscription. A pico cell may cover a relatively small geographic area and may allow unrestricted access by terminals with service subscription. A femto cell may cover a relatively small geographic area (e.g., a home) and may allow restricted access by terminals having association with the femto cell, e.g., terminals belonging to a closed subscriber group (CSG). The CSG may include terminals for users in a home, terminals for users subscribing to a special service plan, etc. A base station for a macro cell may be referred to as a macro base station. A base station for a pico cell may be referred to as a pico base station. A base station for a femto cell may be referred to as a femto base station or a home base station.

In the example shown in FIG. 9, base stations 910a, 910b and 910c may be macro base stations for macro cells 902a, 902b and 902c, respectively. Base station 910x may be a pico base station for a pico cell 902x communicating with terminal 920x. Base station 910y may be a femto base station for a femto cell 902y communicating with terminal 920y. Although not shown in FIG. 9 for simplicity, the macro cells may overlap at the edges. The pico and femto cells may be located within the macro cells (as shown in FIG. 9) or may overlap with macro cells and/or other cells.

Wireless network 900 may also include relay stations, e.g., a relay station 910z that communicates with terminal 920z. A relay station is a station that receives a transmission of data and/or other information from an upstream station and sends a transmission of the data and/or other information to a downstream station. The upstream station may be a base station, another relay station, or a terminal. The downstream station may be a terminal, another relay station, or a base station. A relay station may also be a terminal that relays transmissions for other terminals. A relay station may transmit and/or receive low reuse preambles. For example, a relay station may transmit a low reuse preamble in similar manner as a pico base station and may receive low reuse preambles in similar manner as a terminal.

A network controller 930 may couple to a set of base stations and provide coordination and control for these base stations. Network controller 930 may be a single network entity or a collection of network entities. Network controller 930 may communicate with base stations 910 via a backhaul. Backhaul network communication 934 can facilitate point-to-point communication between base stations 910a-910c employing such a distributed architecture. Base stations 910a-910c may also communicate with one another, e.g., directly or indirectly via wireless or wireline backhaul.

Wireless network 900 may be a homogeneous network that includes only macro base stations (not shown in FIG. 9). Wireless network 900 may also be a heterogeneous network that includes base stations of different types, e.g., macro base stations, pico base stations, home base stations, relay stations, etc. These different types of base stations may have different transmit power levels, different coverage areas, and different impact on interference in wireless network 900. For example, macro base stations may have a high transmit power level (e.g., 20 Watts) whereas pico and femto base stations may have a low transmit power level (e.g., 9 Watt). The techniques described herein may be used for homogeneous and heterogeneous networks.

Terminals 920 may be dispersed throughout wireless network 900, and each terminal may be stationary or mobile. A terminal may also be referred to as an access terminal (AT), a mobile station (MS), user equipment (UE), a subscriber unit, a station, etc. A terminal may be a cellular phone, a personal digital assistant (PDA), a wireless modem, a wireless communication device, a handheld device, a laptop computer, a cordless phone, a wireless local loop (WLL) station, etc. A terminal may communicate with a base station via the downlink and uplink. The downlink (or forward link) refers to the communication link from the base station to the terminal, and the uplink (or reverse link) refers to the communication link from the terminal to the base station.

A terminal may be able to communicate with macro base stations, pico base stations, femto base stations, and/or other types of base stations. In FIG. 9, a solid line with double arrows indicates desired transmissions between a terminal and a serving base station, which is a base station designated to serve the terminal on the downlink and/or uplink. A dashed line with double arrows indicates interfering transmissions between a terminal and a base station. An interfering base station is a base station causing interference to a terminal on the downlink and/or observing interference from the terminal on the uplink.

Wireless network 900 may support synchronous or asynchronous operation. For synchronous operation, the base stations may have the same frame timing, and transmissions from different base stations may be aligned in time. For asynchronous operation, the base stations may have different frame timing, and transmissions from different base stations may not be aligned in time. Asynchronous operation may be more common for pico and femto base stations, which may be deployed indoors and may not have access to a synchronizing source such as Global Positioning System (GPS).

In one aspect, to improve system capacity, the coverage area 902a, 902b, or 902c corresponding to a respective base station 910a-910c can be partitioned into multiple smaller areas (e.g., areas 904a, 904b, and 904c). Each of the smaller areas 904a, 904b, and 904c can be served by a respective base transceiver subsystem (BTS, not shown). As used herein and generally in the art, the term "sector" can refer to a BTS and/or its coverage area depending on the context in which the term is used. In one example, sectors 904a, 904b, 904c in a cell 902a, 902b, 902c can be formed by groups of antennas (not shown) at base station 910, where each group of antennas is responsible for communication with terminals 920 in a portion of the cell 902a, 902b, or 902c. For example, a base station 910 serving cell 902a can have a first antenna group corresponding to sector 904a, a second antenna group corresponding to sector 904b, and a third antenna group corresponding to sector 904c. However, it should be appreciated that the various aspects disclosed herein can be used in a system having sectorized and/or unsectorized cells. Further, it should be appreciated that all suitable wireless communication networks having any number of sectorized and/or unsectorized cells are intended to fall within the scope of the hereto appended claims. For simplicity, the term "base station" as used herein can refer both to a station that serves a sector as well as a station that serves a cell. It should be appreciated that as used herein, a downlink sector in a disjoint link scenario is a neighbor sector. While the following description generally relates to a system in which each terminal communicates with one serving access point for simplicity, it should be appreciated that terminals can communicate with any number of serving access points.

Figure 10:
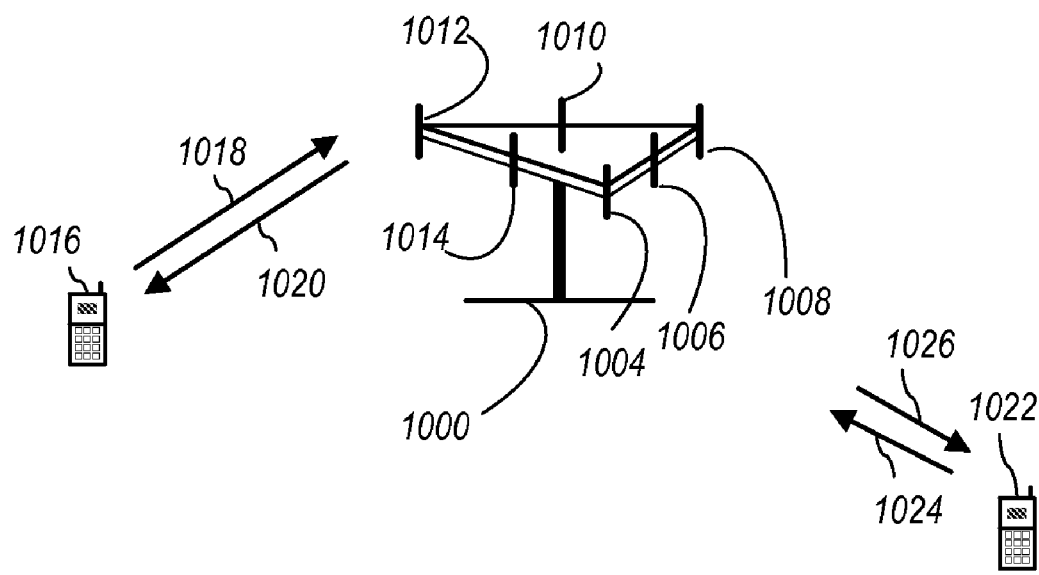
FIG. 10 depicts a macro base station for communication with UE that handles protocol errors.

Referring to FIG. 10, a multiple access wireless communication system according to one embodiment is illustrated. An access point (AP) 1000 includes multiple antenna groups, one including 1004 and 1006, another including 1008 and 1010, and an additional including 1012 and 1014. In FIG. 10, only two antennas are shown for each antenna group, however, more or fewer antennas may be utilized for each antenna group. Access terminal (AT) 1016 is in communication with antennas 1012 and 1014, where antennas 1012 and 1014 transmit information to access terminal 1016 over forward link 1020 and receive information from access terminal 1016 over reverse link 1018. Access terminal 1022 is in communication with antennas 1006 and 1008, where antennas 1006 and 1008 transmit information to access terminal 1022 over forward link 1026 and receive information from access terminal 1022 over reverse link 1024. In a FDD system, communication links 1018, 1020, 1024 and 1026 may use different frequency for communication. For example, forward link 1020 may use a different frequency then that used by reverse link 1018.

Each group of antennas and/or the area in which they are designed to communicate is often referred to as a sector of the access point. In the aspect, antenna groups each are designed to communicate to access terminals in a sector, of the areas covered by access point 1000.

In communication over forward links 1020 and 1026, the transmitting antennas of access point 1000 utilize beamforming in order to improve the signal-to-noise ratio of forward links for the different access terminals 1016 and 1022. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 11:
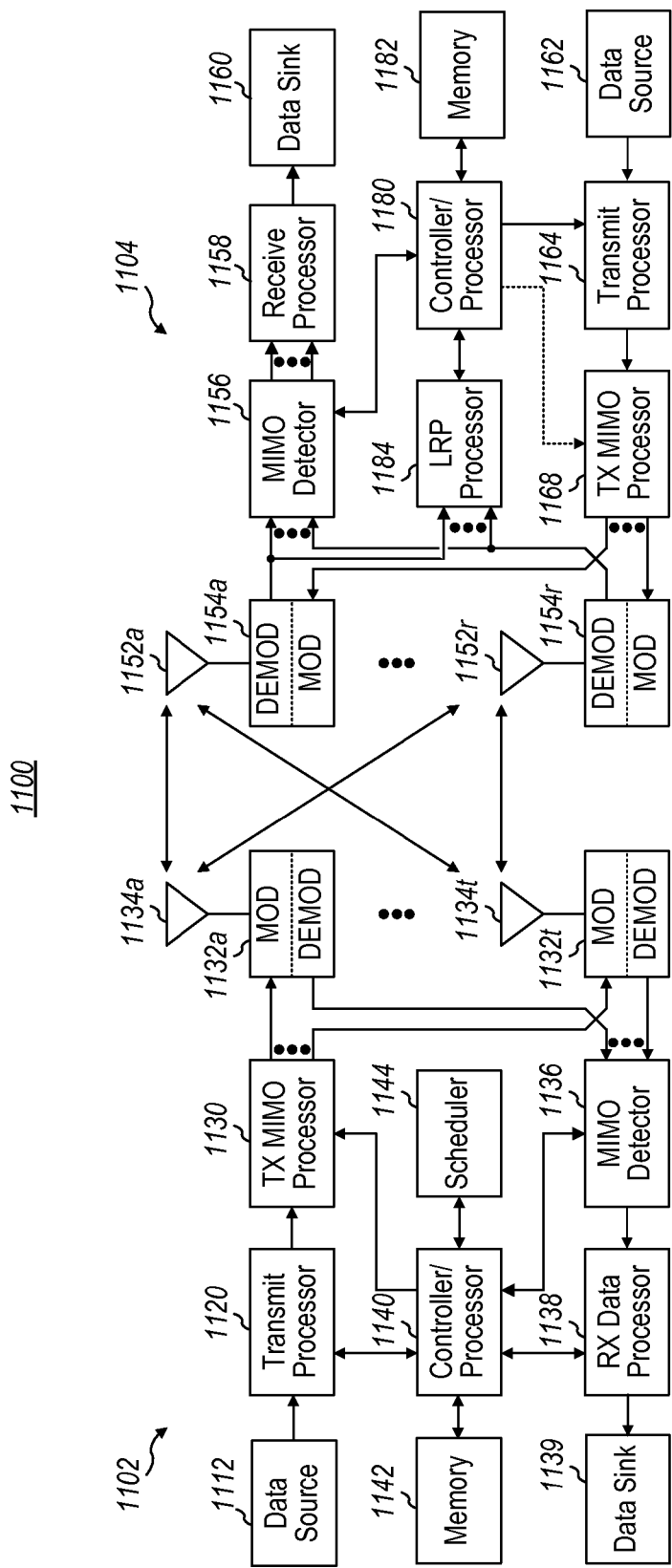
FIG. 11 depicts a block diagram of a communication system that handles protocol errors.

FIG. 11 shows a block diagram of a design of communication system 1100 between a base station 1102 and a terminal 1104, which may be one of the base stations and one of the terminals in FIG. 1. Base station 1102 may be equipped with TX antennas 1134a through 1134t, and terminal 1104 may be equipped with RX antennas 1152a through 1152r, where in general T≧1 and R≧1.

At base station 1102, a transmit processor 1120 may receive traffic data from a data source 1112 and messages from a controller/processor 1140. Transmit processor 1120 may process (e.g., encode, interleave, and modulate) the traffic data and messages and provide data symbols and control symbols, respectively. Transmit processor 1120 may also generate pilot symbols and data symbols for a low reuse preamble and pilot symbols for other pilots and/or reference signals. A transmit (TX) multiple-input multiple-output (MIMO) processor 1130 may perform spatial processing (e.g., precoding) on the data symbols, the control symbols, and/or the pilot symbols, if applicable, and may provide T output symbol streams to T modulators (MODs) 1132a through 1132t. Each modulator 1132 may process a respective output symbol stream (e.g., for OFDM, SC-FDM, etc.) to obtain an output sample stream. Each modulator 1132 may further process (e.g., convert to analog, amplify, filter, and upconvert) the output sample stream to obtain a downlink signal. T downlink signals from modulators 1132a through 1132t may be transmitted via T antennas 1134a through 1134t, respectively.

At terminal 1104, antennas 1152a through 1152r may receive the downlink signals from base station 1102 and may provide received signals to demodulators (DEMODs) 1154a through 1154r, respectively. Each demodulator 1154 may condition (e.g., filter, amplify, downconvert, and digitize) a respective received signal to obtain input samples. Each demodulator 1154 may further process the input samples (e.g., for OFDM, SC-FDM, etc.) to obtain received symbols. A MIMO detector 1156 may obtain received symbols from all R demodulators 1154a through 1154r, perform MIMO detection on the received symbols if applicable, and provide detected symbols. A receive processor 1158 may process (e.g., demodulate, deinterleave, and decode) the detected symbols, provide decoded traffic data for terminal 1104 to a data sink 1160, and provide decoded messages to a controller/processor 1180. A low reuse preamble (LRP) processor 1184 may detect for low reuse preambles from base stations and provide information for detected base stations or cells to controller/processor 1180.

On the uplink, at terminal 1104, a transmit processor 1164 may receive and process traffic data from a data source 1162 and messages from controller/processor 1180. The symbols from transmit processor 1164 may be precoded by a TX MIMO processor 1168 if applicable, further processed by modulators 1154a through 1154r, and transmitted to base station 1102. At base station 1102, the uplink signals from terminal 1104 may be received by antennas 1134, processed by demodulators 1132, detected by a MIMO detector 1136 if applicable, and further processed by a receive data processor 1138 to obtain the decoded packets and messages transmitted by terminal 1104 for providing to a data sink 1139.

Controllers/processors 1140 and 1180 may direct the operation at base station 1102 and terminal 1104, respectively. Processor 1140 and/or other processors and modules at base station 1102 may perform or direct processes for the techniques described herein. Processor 1184 and/or other processors and modules at terminal 1104 may perform or direct processes for the techniques described herein. Memories 1142 and 1182 may store data and program codes for base station 1102 and terminal 1104, respectively. A scheduler 1144 may schedule terminals for data transmission on the downlink and/or uplink and may provide resource grants for the scheduled terminals.

Figure 12:
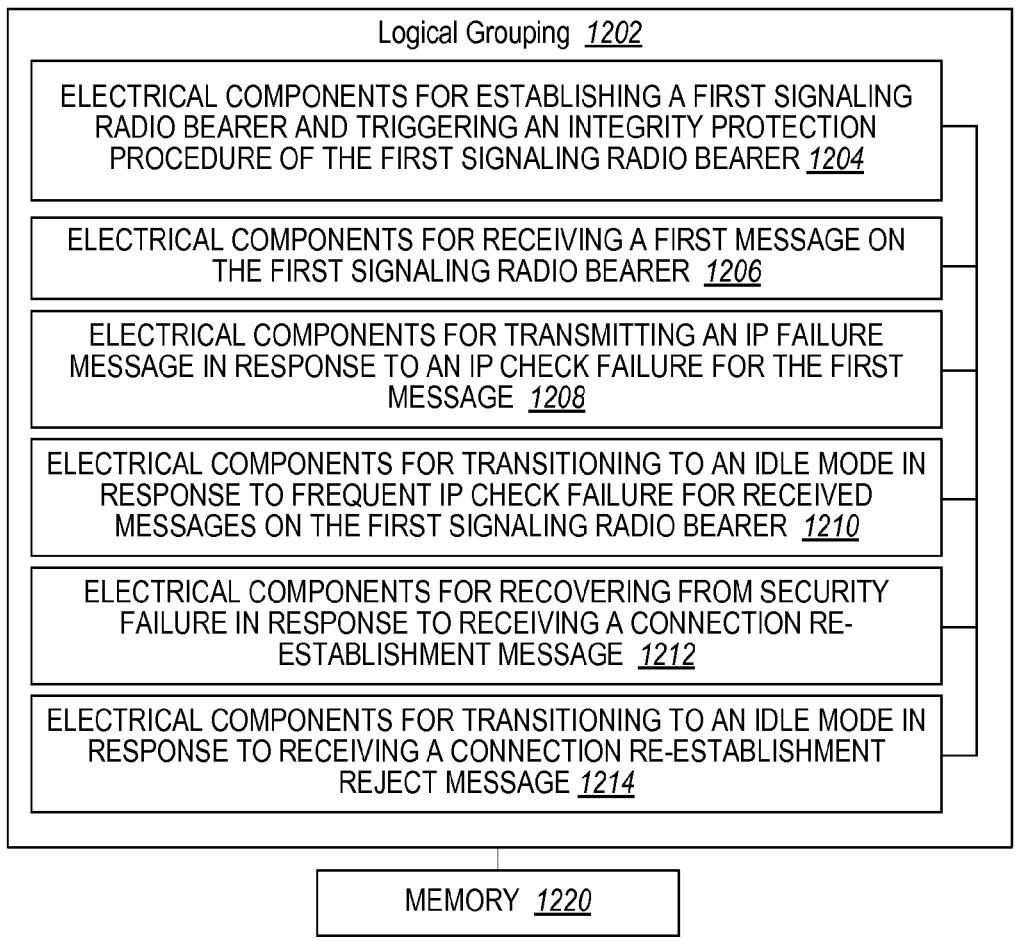
FIG. 12 depicts a block diagram of a system having logical groupings of electrical components for handling protocol errors at UE.

With reference to FIG. 12, illustrated is a system 1200 for handling protocol errors in a wireless communications system. For example, system 1200 can reside at least partially within user equipment (UE). It is to be appreciated that system 1200 is represented as including functional blocks, which can be functional blocks that represent functions implemented by a computing platform, processor, software, or combination thereof (e.g., firmware). System 1200 includes a logical grouping 1202 of electrical components that can act in conjunction. For instance, logical grouping 1202 can include an electrical component for establishing a first signaling radio bearer and triggering an integrity protection procedure of the first signaling radio bearer 1204. Moreover, logical grouping 1202 can include an electrical component for receiving a first message on the first signaling radio bearer 1206. Further, logical grouping 1202 can include an electrical component for transmitting an IP failure message in response to an IP check failure for the first message 1208. Logical grouping 1202 can include an electrical component for transitioning to an idle mode in response to frequent IP check failure for received messages on the first signaling radio bearer 1210. Logical grouping 1202 can include an electrical component for recovering from security failure in response to receiving a connection re-establishment message 1212. Logical grouping 1202 can include an electrical component for transitioning to an idle mode in response to receiving a connection re-establishment reject message not subject to the integrity protection procedure 1214. Additionally, system 1200 can include a memory 1220 that retains instructions for executing functions associated with electrical components 1204-1214. While shown as being external to memory 1220, it is to be understood that one or more of electrical components 1204-1214 can exist within memory 1220.

Figure 13:
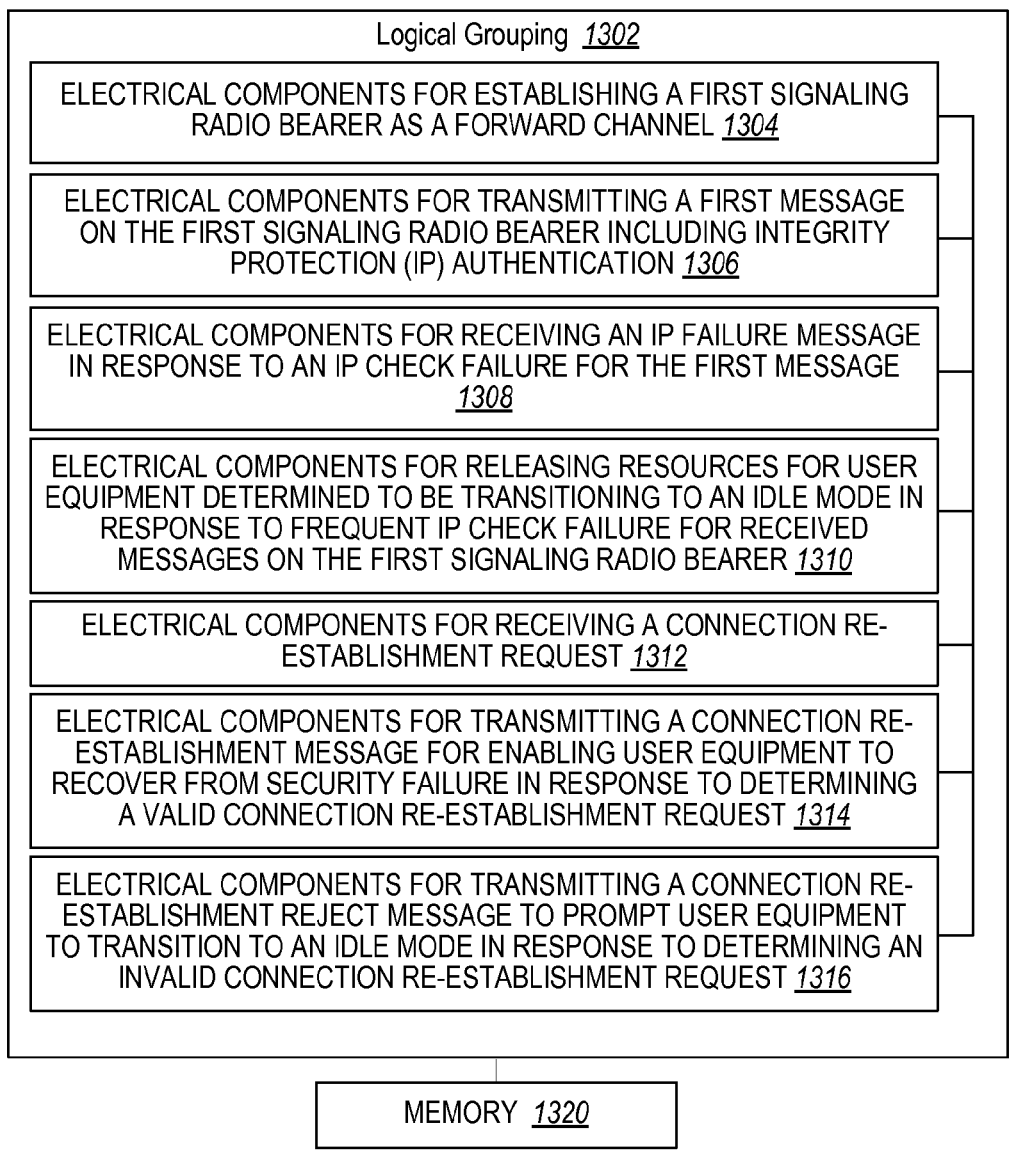
FIG. 13 depicts a block diagram of a system having logical groupings of electrical components for handling protocol errors at a base node.

With reference to FIG. 13, illustrated is a system 1300 for handling protocol errors in a wireless communication system. For example, system 1300 can reside at least partially within a base station. It is to be appreciated that system 1300 is represented as including functional blocks, which can be functional blocks that represent functions implemented by a computing platform, processor, software, or combination thereof (e.g., firmware). System 1300 includes a logical grouping 1302 of electrical components that can act in conjunction. For instance, logical grouping 1302 can include an electrical component for establishing a first signaling radio bearer as a forward channel 1304. Moreover, logical grouping 1302 can include an electrical component for transmitting a first message on the first signaling radio bearer including integrity protection (IP) authentication 1306. Further, logical grouping 1302 can include an electrical component for receiving an IP failure message in response to an IP check failure for the first message 1308. Logical grouping 1302 can include an electrical component for releasing resources for user equipment determined to be transitioning to an idle mode in response to frequent IP check failure for received messages on the first signaling radio bearer 1310. Logical grouping 1302 can include an electrical component for receiving a connection re-establishment request 1312. Logical grouping 1302 can include an electrical component for transmitting a connection re-establishment message for enabling user equipment to recover from security failure in response to determining a valid connection re-establishment request 1314. Logical grouping 1302 can include an electrical component for transmitting a connection re-establishment reject message not subject to the integrity protection procedure to prompt user equipment to transition to an idle mode in response to determining an invalid connection re-establishment request 1316. Additionally, system 1300 can include a memory 1320 that retains instructions for executing functions associated with electrical components 1304-1316. While shown as being external to memory 1320, it is to be understood that one or more of electrical components 1304-1316 can exist within memory 1320.

Figure 14:
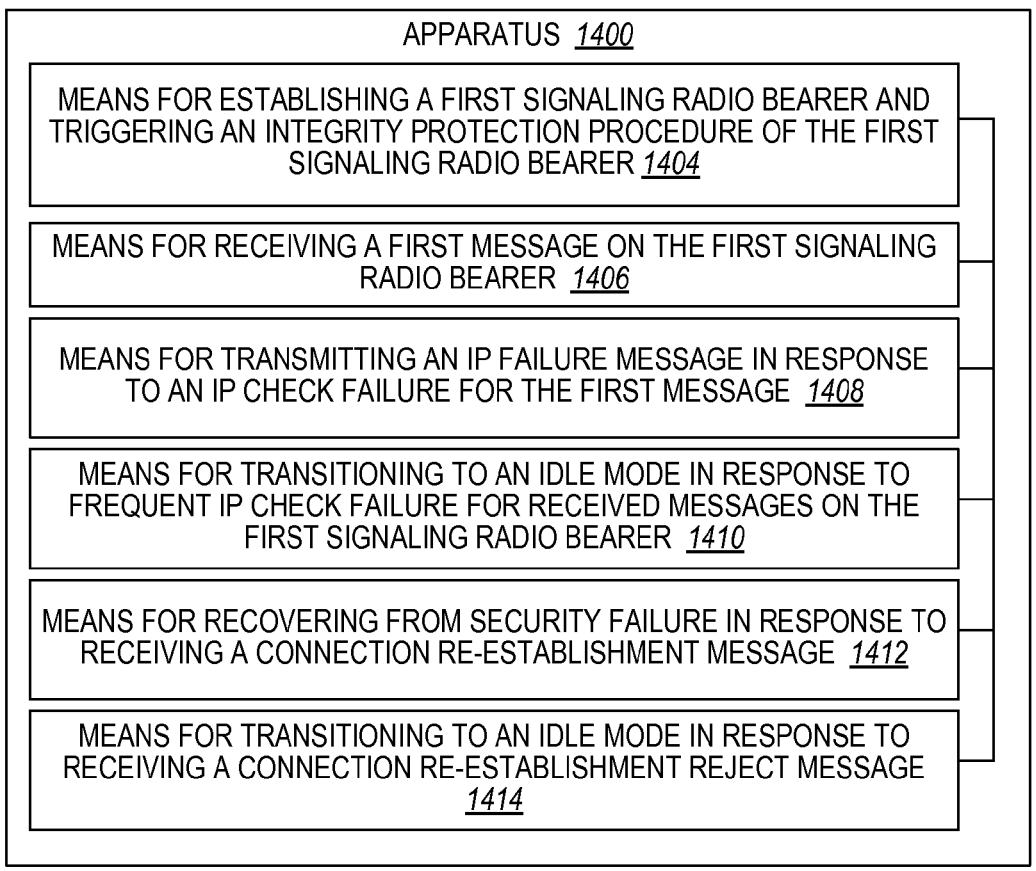
FIG. 14 depicts a block diagram of an apparatus having means for handling protocol errors at a UE.

With reference to FIG. 14, illustrated is an apparatus 1400 for handling protocol errors in a wireless communications system. For example, apparatus 1400 can reside at least partially within user equipment (UE). Apparatus 1400 provides means for establishing a first signaling radio bearer and triggering an integrity protection procedure of the first signaling radio bearer 1404. Moreover, apparatus 1400 provides means for receiving a first message on the first signaling radio bearer 1406. Further, apparatus 1400 provides means for transmitting an IP failure message in response to an IP check failure for the first message 1408. Apparatus 1400 provides means for transitioning to an idle mode in response to frequent IP check failure for received messages on the first signaling radio bearer 1410. Apparatus 1400 provides means for recovering from security failure in response to receiving a connection re-establishment message 1412. Apparatus 1400 provides means for transitioning to an idle mode in response to receiving a connection re-establishment reject message not subject to the integrity protection procedure 1414.

Figure 15:
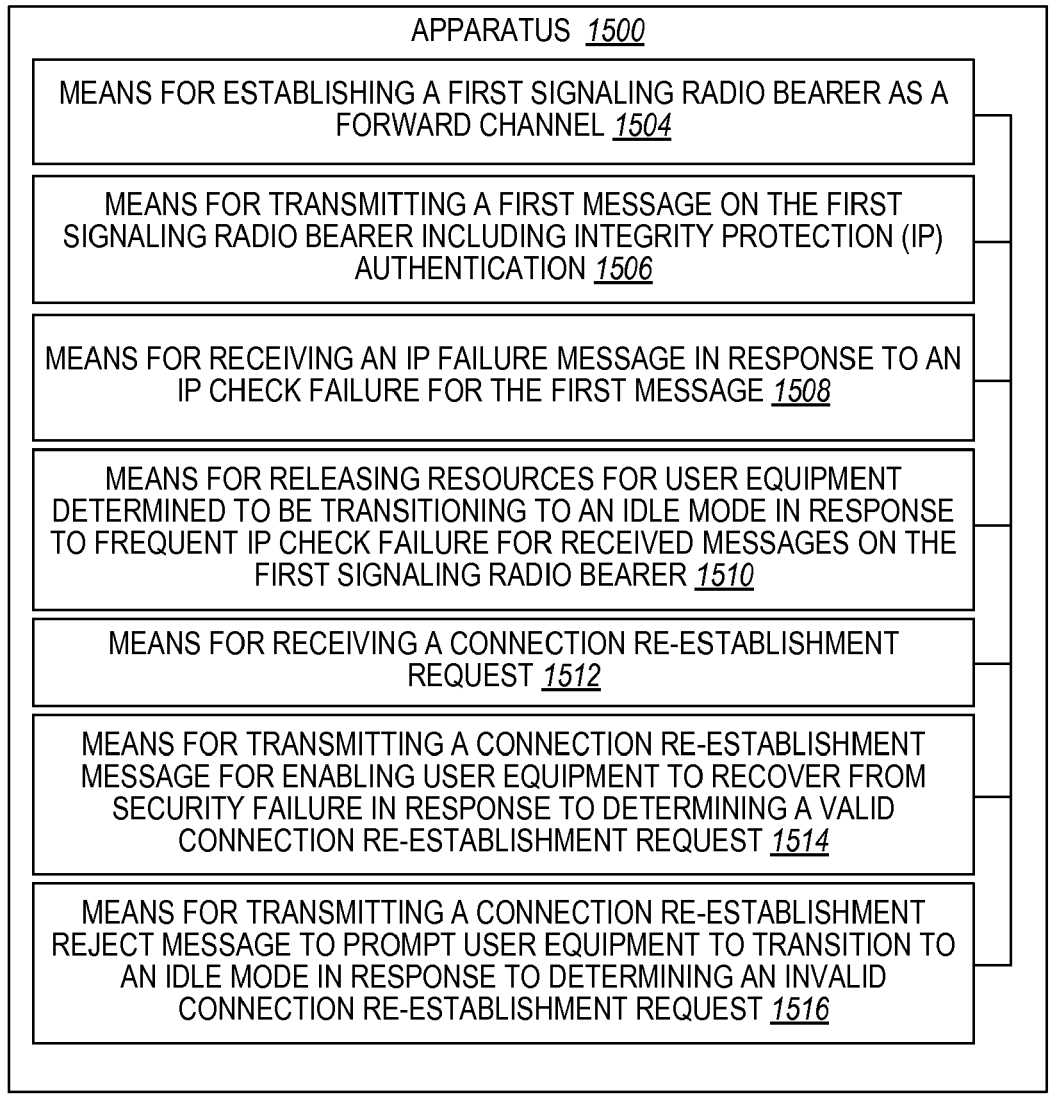
FIG. 15 depicts a block diagram of an apparatus having means for handling protocol errors at a base node.

With reference to FIG. 15, illustrated is an apparatus 1500 for handling protocol errors in a wireless communication system. For example, apparatus 1500 can reside at least partially within a base station. Apparatus 1500 provides means for establishing a first signaling radio bearer as a forward channel 1504. Apparatus 1500 provides means for transmitting a first message on the first signaling radio bearer including integrity protection (IP) authentication 1506. Apparatus 1500 provides means for receiving an IP failure message in response to an IP check failure for the first message 1508. Apparatus 1500 provides means for releasing resources for user equipment determined to be transitioning to an idle mode in response to frequent IP check failure for received messages on the first signaling radio bearer 1510. Apparatus 1500 provides means for receiving a connection re-establishment request 1512. Apparatus 1500 provides means for transmitting a connection re-establishment message for enabling user equipment to recover from security failure in response to determining a valid connection re-establishment request 1514. Apparatus 1500 provides means for transmitting a connection re-establishment reject message not subject to the integrity protection procedure to prompt user equipment to transition to an idle mode in response to determining an invalid connection re-establishment request 1516.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Furthermore, the one or more versions may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for handling protocol errors in a wireless communications system comprising:
    employing a processor executing computer executable instructions stored on a computer readable storage medium to implement the following acts:
    establishing a first signaling radio bearer and triggering an integrity protection procedure of the first signaling radio bearer;
    receiving messages, from a node, on the first signaling radio bearer, wherein the received messages include a first message;
    transmitting an integrity protection check failure message to the node in response to an integrity protection check failure, for the first message, detected by the integrity protection procedure; and
    transitioning to an idle mode in response to a count of integrity protection check failures for the received messages on the first signaling radio bearer meeting a threshold value of at least two.

2. The method of claim 1, wherein the count of integrity protection check failures meeting the threshold value comprises the count of integrity protection check failures meeting the threshold value during a time period.

3. The method of claim 1, wherein the count of integrity protection check failures meeting the threshold value comprises a count of consecutive integrity protection check failures meeting the threshold value.

4. The method of claim 1, further comprising:
    receiving a connection release message in response to the transmitted integrity protection check failure message.

5. The method of claim 4, further comprising treating each of a plurality of received connection release messages as an integrity protection check failure in the count of integrity protection check failures.

6. The method of claim 4, wherein the connection release message is received on a second signaling radio bearer that is not subject to the integrity protection procedure.

7. The method of claim 1, further comprising establishing the first radio signal bearer on a downlink from a base node, comprising the node, to a user equipment.

8. An apparatus for handling protocol errors in a wireless communications system comprising:
    at least one processor;
    at least one computer readable storage medium storing computer executable instructions that when executed by the at least one processor implement components comprising:
    means for establishing a first signaling radio bearer and triggering an integrity protection procedure of the first signaling radio bearer;
    means for receiving messages, from a node, on the first signaling radio bearer, wherein the received messages include a first message;
    means for transmitting an integrity protection failure message to the node in response to an integrity protection check failure, for the first message, detected by the integrity protection procedure; and
    means for transitioning to an idle mode in response to a count of integrity protection check failures for the received messages on the first signaling radio bearer meeting a threshold value of at least two.

9. An apparatus for handling protocol errors in a wireless communications system comprising:
    a processor operatively coupled to a computer readable medium having stored thereon the following computer executable components:

a computing platform for establishing a first signaling radio bearer and triggering an integrity protection procedure of the first signaling radio bearer;

a receiver for receiving messages, from a node, on the first signaling radio bearer, wherein the received messages include a first message;

a transmitter for transmitting an integrity protection failure message to the node in response to an integrity protection check failure, for the first message, detected by the integrity protection procedure; and the computing platform further for transitioning to an idle mode in response to a count of integrity protection check failures for the received messages on the first signaling radio bearer meeting a threshold value of at least two.

10. The apparatus of claim 9, wherein the count of integrity protection check failures meeting the threshold value comprises the count of integrity protection check failures meeting the threshold value during a time period.

11. The apparatus of claim 9, wherein the count of integrity protection check failures meeting the threshold value comprises a count of consecutive integrity protection check failures meeting the threshold value.

12. The apparatus of claim 9, wherein the receiver is further for receiving a connection release message in response to the transmitted integrity protection check failure message.

13. The apparatus of claim 12, wherein the computing platform treats each of a plurality of received connection release messages as an integrity protection check failure in the count of integrity protection check failures.

14. The apparatus of claim 12, wherein the receiver is further for receiving the connection release message on a second signaling radio bearer not subject to the integrity protection procedure.

15. The apparatus of claim 9, wherein the computing platform is further for establishing the first radio signal bearer on a downlink from a base node, comprising the node, to a user equipment.

16. A computer program product for handling protocol errors in a wireless communications system comprising:

at least one computer readable storage medium storing computer executable instructions that when executed by at least one processor implement components comprising:

a set of instructions for causing a computer to establish a first signaling radio bearer and triggering an integrity protection procedure of the first signaling radio bearer;

a set of instructions for causing the computer to receive messages, from a node, on the first signaling radio bearer, wherein the received messages include a first message;

a set of instructions for causing the computer to transmit an integrity protection check failure message to the node in response to an integrity protection check failure, for the first message, detected by the integrity protection procedure; and a set of instructions for causing the computer to transition to an idle mode in response to a count of integrity protection check failures for the received messages on the first signaling radio bearer meeting a threshold value of at least two.

* * * * *